(12) United States Patent
An et al.

(10) Patent No.: US 7,623,503 B2
(45) Date of Patent: Nov. 24, 2009

(54) METHOD OF TRANSMITTING OVERHEAD MESSAGE IN A MOBILE WIRELESS COMMUNICATION SYSTEM

(75) Inventors: Jong Hoe An, Seoul (KR); Young Jun Kim, Anyang-si (KR); Chan Ho Kyung, Anyang-si (KR); Young Woo Yun, Seoul (KR)

(73) Assignee: LG Electronics Inc., Seoul (KR)

( * ) Notice: Subject to any disclaimer, the term of this patent is extended or adjusted under 35 U.S.C. 154(b) by 661 days.

(21) Appl. No.: 11/371,515

(22) Filed: Mar. 8, 2006

(65) Prior Publication Data
US 2006/0203767 A1 Sep. 14, 2006

(30) Foreign Application Priority Data
Mar. 10, 2005 (KR) ............. 10-2005-0020225

(51) Int. Cl.
*H04J 3/00* (2006.01)
*H04B 7/00* (2006.01)
*H04W 4/00* (2009.01)

(52) U.S. Cl. ............. 370/345; 455/515; 455/434
(58) Field of Classification Search ............ 455/515, 455/434; 370/345
See application file for complete search history.

(56) References Cited
U.S. PATENT DOCUMENTS
2002/0191583 A1 12/2002 Harris et al.
2004/0092280 A1 5/2004 Lee 2005/0096053 A1* 5/2005 Liu et al. ............. 455/439
2005/0207365 A1* 9/2005 Balachandran et al. ...... 370/312

FOREIGN PATENT DOCUMENTS
WO WO 03/053093 A1 6/2003

OTHER PUBLICATIONS

3GPP2: "Upper Layer (Layer 3) Signaling Standard for cdma2000 Spread Spectrum Systems, Release D" 3GPP2 C.S0005-D, Version 1.0, [online] Feb. 2004 [retrieved on Jun. 29, 2006]. Retrieved from the internet<URL:http://www.3gpp2.org/Public_html/specs/C.S0005-D_v1.0_L3_031504.pdf>. section 2.6.2.1.1.3.8, p. 2-88.
3PP2: "Upper Layer (Layer 3) Signaling Standard for cdma2000 Spread Spectrum Systems, Release D" 3GPP2 C.S0005-D, Version 2.0, [online] Sep. 2005 [retrieved on Jun. 29, 2006]. Retrieved from the Internet<URL:http://www.3gpp2.org/Public_html/specs/C.S0005-D_v2.0_051006.pdf>. section 2.6.2.1.1.3.8, p. 2-99-p. 2-100.

* cited by examiner

*Primary Examiner*—Vincent P Harper
*Assistant Examiner*—Marisol Figueroa
(74) *Attorney, Agent, or Firm*—Lee, Hong, Degerman, Kang & Waimey (57) ABSTRACT

A method of transmitting an overhead message via a control channel which has at least one slot is disclosed. More specifically, a base station (BS) transmits an overhead slot cycle index for providing the overhead message to a mobile station (MS) and thereafter, receives the overhead slot cycle index and determining an overhead slot cycle. Furthermore, the BS transmits the overhead message on a first slot of each overhead slot cycle according to a variable duration of the slot, and then receives the overhead message from the first slot of each overhead slot cycle according to the variable duration of the slot.

13 Claims, 8 Drawing Sheets

METHOD OF TRANSMITTING OVERHEAD MESSAGE IN A MOBILE WIRELESS COMMUNICATION SYSTEM

This application claims the benefit of Korean Application No. P10-2005-0020225, filed on Mar. 10, 2005, which is hereby incorporated by reference.

BACKGROUND OF THE INVENTION

1. Field of the Invention

The present invention relates to a method of transmitting an overhead message, and more particularly, to a method of transmitting an overhead message in a mobile wireless communication system by syncing the slots of the control channel frame with the slots of the overhead message frame.

2. Discussion of the Related Art

The present invention relates to determining transmission and receiving slots of an overhead message for broadcast/multicast transmission in a Code Division Multiple Access (CDMA) 2000 system and mobile stations. The broadcast/multicast transmission is a transmission scheme by which data can be sent from one source to multiple sources. In broadcast mode, the mobile stations in the service area can receive the broadcast data by being in broadcast receiving mode. In multicast mode, the mobile stations in the service area can receive data by subscribing to a specified multicast service.

The broadcast/multicast service (BCMCS) of CDMA 2000 can be described according to the following three categories. The first category relates to carrying out the BCMCS by using a Forward Broadcast Supplemental Channel (F-BSCH) shared by the mobile stations, which are in idle mode. The F-BSCH is appropriate for the broadcast environment, and at the same time, the F-BSCH is useful in transmitting information to unspecified number of mobile stations. Since the information is transmitted to unspecified number of mobile stations, which are in idle mode, before the traffic channel allocated, portion of transmission power from a base station should be fixedly allocated so that the mobile stations near the cell borders can receive the information as well.

The second category relates to carrying out the BCMCS by using a Forward Broadcast Fundamental Channel (F-BFCH) shared by the mobile stations which are in traffic receiving mode. A method of using the F-BFCH is similar to Push-To-Talk (PTT) method in that the F-BFCH is useful in transmitting the information to a specified number of mobile stations. Here, the traffic channel is first allocated before the information can be transmitted. As such, the transmission power of the F-BFCH is controlled based on the status of other mobile stations sharing the channel and therefore, power can be controlled more efficiently.

The third category relates to carrying out the BCMCS by using a Forward Broadcast Supplemental Channel (F-BSCH) shared by the mobile stations, which are in traffic receiving mode. The F-BSCH is useful in transmitting information to a small number of mobile stations in broadcast receiving mode in a cell. Consequently, transmission power consumption for transmitting broadcast service is low, and less Walsh code is used.

In order for the mobile stations to receive the BCMCS, each mobile station has to receive from a base station information related to broadcast/multicast service, information related to channels used to transmit broadcast/multicast service (e.g., frequency, Walsh code, data rate, size of frame, and public long-code mask), and information related to mobile station registration, to name a few. These types of information are usually transmitted periodically via overhead messages, such as a Broadcast/Multicast Service Parameters Message (BSPM), for example. The mobile station in mode to receive the BCMCS receives an overhead message, such as the BSPM.

Figure 1:
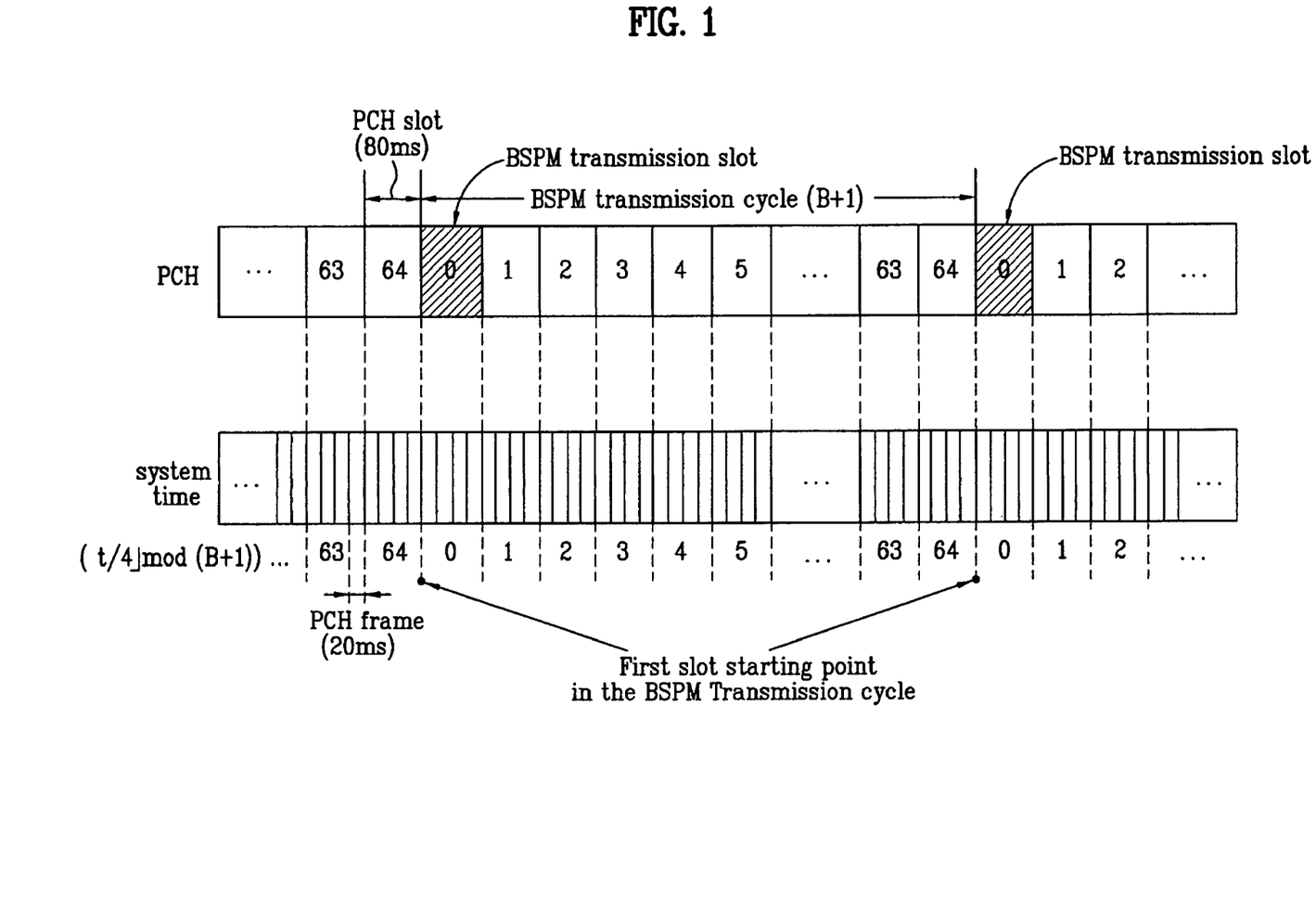
FIG. 1 illustrates a method of transmitting the BSPM via the PCH.

More specifically, the BSPM can be transmitted periodically via a Paging Channel (PCH) or a Primary Broadcast Control Channel (P-BCCH). FIG. 1 illustrates a method of transmitting the BSPM via the PCH. In FIG. 1, the PSPM-PERIOD_INDEX is 2. Moreover, the transmission duration is defined by (B+1) slots of the PCH, where B is determined by Equation 1.

$$B = 2^i \times 16, \quad 0 \leq i \leq 7 \quad \text{[Equation 1]}$$

In Equation 1, i is transmitted via BSPM_PERIOD_INDEX included in an Extended System Parameters Message.

As for determining the first slot of each BSPM slot cycle, Equation 2 has to be satisfied.

$$\left[\frac{t}{4}\right] \bmod (B+1) = 0 \quad \text{[Equation 2]}$$

In Equation 2, t represents system time of the PCH frame unit. Furthermore, the reason for dividing the system time into four slots is because the duration of the PCH frame is different from the duration of the PCH slot. That is, since the duration of the PCH frame is 20 ms and the duration of the PCH slot is 80 ms, the system time is divided into four slots in order to express the BSPM slot cycle in PCH slot units. According to Equation 2, as shown in FIG. 1, the BSPM slot cycle can be synced with the PCH slot.

Figure 2:
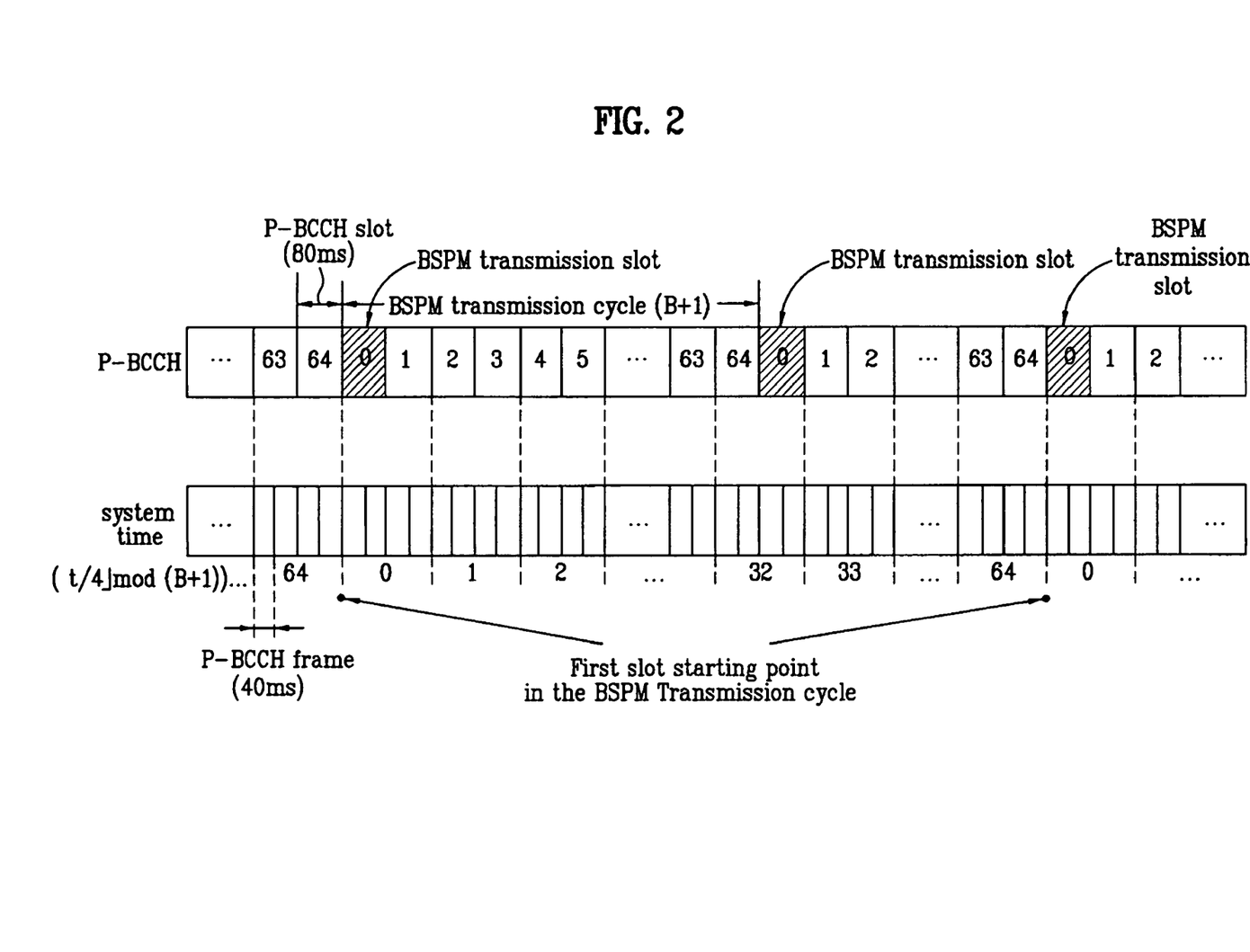
FIG. 2 illustrates a method of transmitting BSPM via the P-BCCH.

FIG. 2 illustrates a method of transmitting BSPM via the P-BCCH. In FIG. 2, BSPM-PERIOD_INDEX is 2, and the duration of the BCCH slot is 80 ms. Moreover, the duration of the BSPM slot cycle is (B+1) slots of the BCCH, and B is determined by Equation 3.

$$B = 2^i \times 16, \quad 0 \leq i \leq 7 \quad \text{[Equation 3]}$$

In Equation 3, i is transmitted via BSPM_PERIOD_INDEX included in a Multi-Carrier Radio Resource (MC-RR) Parameters Message.

To determine the first slot of each BSPM slot cycle, Equation 4 has to be satisfied.

$$\left[\frac{t}{4}\right] \bmod (B+1) = 0 \quad \text{[Equation 4]}$$

In Equation 4, t represents system time of the PCH frame unit. According to FIG. 2, the duration of the BCCH is 40 ms and the duration of the BCCH slot is 80 ms. If the first slot of the BSPM slot cycle is calculated using Equation 4, the BCCH frame slots are not in sync. This is where the problem lies. In other words, since the first slot of the BSPM slot cycle can be selected from any one of 40 ms, 80 ms, and 160 ms based on the BCCH data rates, the first slot of the BSPM slot cycle cannot be synced with the BCCH slot. In short, the slots of the overhead message transmission cycle cannot be synced with the slots of the BCCH.

SUMMARY OF THE INVENTION

Accordingly, the present invention is directed to a method of transmitting an overhead message in a mobile wireless communication system that substantially obviates one or more problems due to limitations and disadvantages of the related art.

An object of the present invention is to provide a method of transmitting an overhead message via a control channel having at least one slot.

Another object of the present invention is to provide a method of receiving an overhead message via a control channel having at least one slot.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting an overhead message via a control channel having at least one slot includes transmitting an overhead slot cycle index for providing the overhead message to a mobile station (MS) and receiving the overhead slot cycle index and determining an overhead slot cycle. Furthermore, the method includes transmitting the overhead message on a first slot of each overhead slot cycle according to a variable duration of the slot, and receiving the overhead message from the first slot of each overhead slot cycle according to the variable duration of the slot.

In another aspect of the present invention, a method of receiving an overhead message via a control channel having at least one slot includes receiving an overhead slot cycle index for providing the overhead message from a base station (BS) and transmitting the overhead slot cycle index. Furthermore, the method includes receiving the overhead message on a first slot of each overhead slot cycle determined by the BS according to a variable duration of the slot, and transmitting the overhead message on the first slot of each overhead slot cycle according to the variable duration of the slot.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In BCCH, a maximum of eight slots can be allocated, and each BCCH can be classified by a Broadcast Control Channel Number (BCN). The BCCH having BCN of 1 can be considered as the P-BCCH and is used to transmit the overhead message. Moreover, the BCCH having BCN of 2 can be considered a Secondary BCCH (S-BCCH) and is used to transmit the broadcast message. The BSPM, which is an overhead message used for transmitting the BCMCS, can be transmitted via the P-BCCH.

The transmission data rate of the BCCH is determined by the BCCH data rates included in the Sync Channel Message, and the transmission data rate can be any one of following data rates—4,800 bps, 9,600 bps, and 19,200 bps, for example.

The BCCH frame is comprised of plurality slots whose duration is 40 ms. Furthermore, the slot of the BCCH can be any one of the following duration, i.e., 40 ms, 80 ms, or 160 ms, based on the BCCH transmission data rate. That is, if the BCCH transmission data rate is 19,200 bps, the duration of the BCCH slot is 40 ms. Also, if the transmission data rates of the BCCH are 9,600 bps and 4,800 bps, the durations of the BCCH slot is 80 ms and 160 ms, respectively.

As described above, since the duration of the BCCH slot varies based on the BCCH data rates, the first slot of the BSPM slot cycle can be modified or adjusted according to the duration of the BCCH slot.

Figure 3:
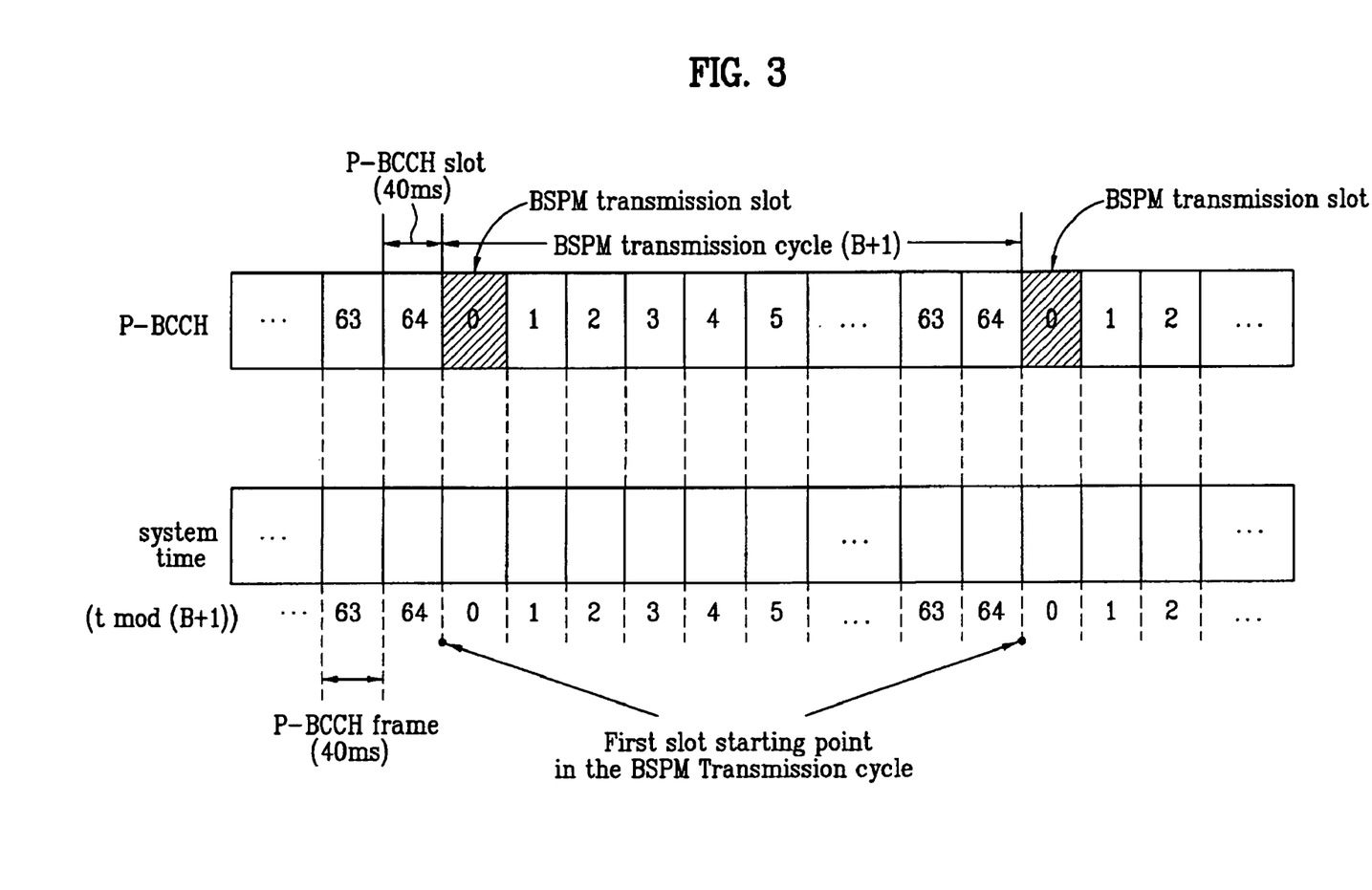
FIG. 3 illustrates an example of transmitting the BSPM via the P-BCCH where BSPM_PERIOD_INDEX is 2 and the duration of the P-BCCH slot is 40 ms.

FIG. 3 illustrates an example of transmitting the BSPM via the P-BCCH. In FIG. 3, BSPM_PERIOD_INDEX is 2 and the duration of the P-BCCH slot is 40 ms.

In the present embodiment, since the duration of the P-BCCH frame corresponding to system time is 40 ms and the duration of the P-BCCH slot is 40 ms, the first slot of the BSPM transmission slot cycle with respect to the system time can be determined by satisfying Equation 5.

$$t \bmod (B+1) = 0 \qquad \text{[Equation 5]}$$

In Equation 5, B is determined as in Equation 3, and t represents the system time according to the P-BCCH frame. If the first slot of the BSPM transmission slot cycle is determined using Equation 5, the BSPM slot cycle can be synced with the P-BCCH frames as depicted in FIG. 3.

More specifically, for example, since the duration of the P-BCCH slot is 40 ms and the duration of the P-BCCH frame of the system time is also 40 ms, one-to-one correspondence exists between the two. As such, the BSPM slot cycle can be synced with the P-BCCH frames correspondingly.

Figure 4:
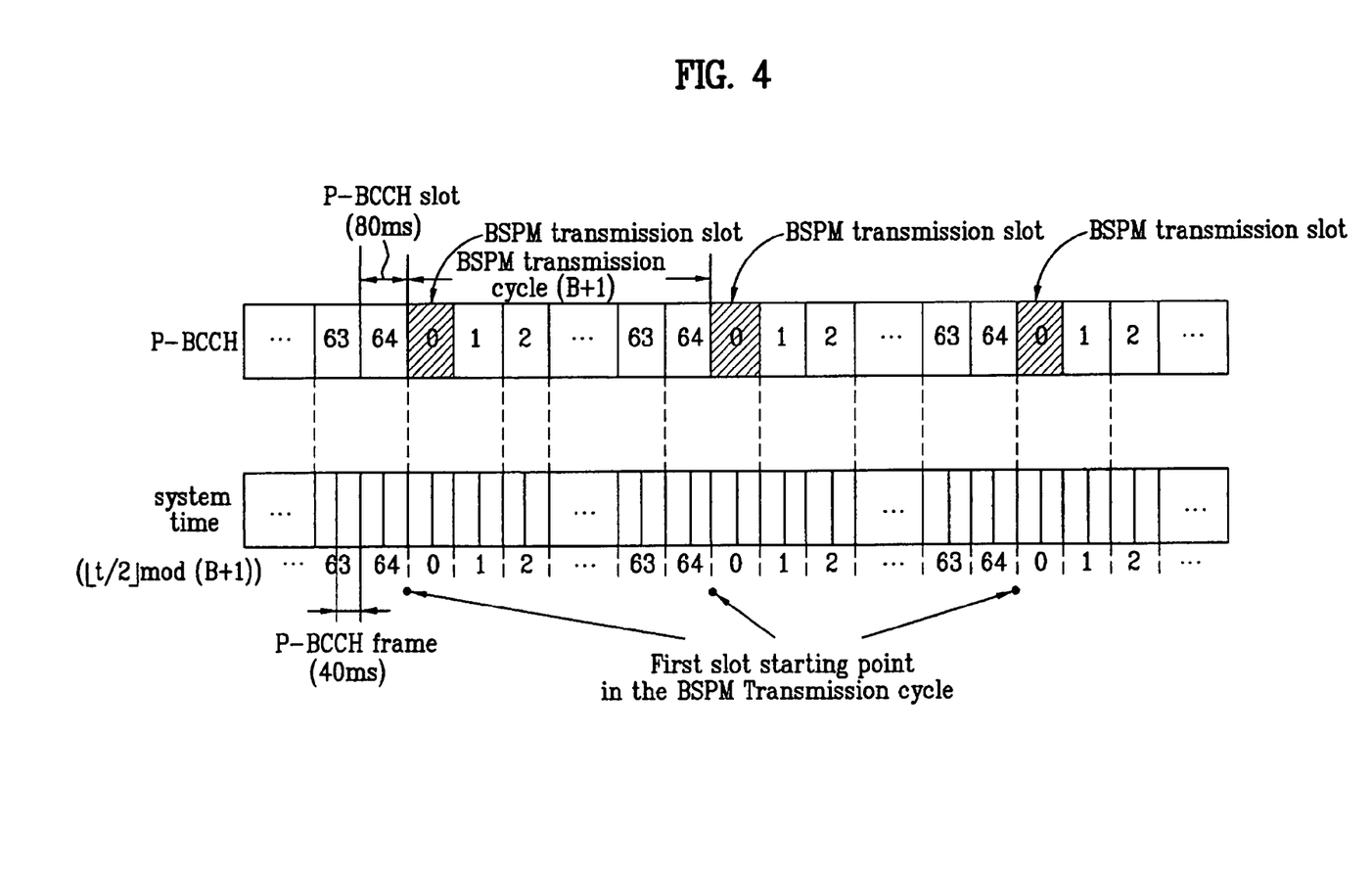
FIG. 4 illustrates an example of transmitting the BSPM via the P-BCCH where BSPM_PERIOD_INDEX is 2 and the duration of the P-BCCH slot is 80 ms.

FIG. 4 illustrates an example of transmitting the BSPM via the P-BCCH according to a second embodiment of the present invention. In FIG. 4, BSPM_PERIOD_INDEX is 2, and the duration of the P-BCCH slot is 80 ms.

In the present embodiment, since the duration of the P-BCCH frame corresponding to the system time is 40 ms and the duration of the P-BCCH slot is 80 ms, there is no one-to-one correspondence as found in FIG. 3. Therefore, the first slot of the BSPM transmission slot cycle with respect to the system time can be determined by satisfying Equation 6.

$$\left[\frac{t}{2}\right] \bmod (B+1) = 0 \qquad [\text{Equation 6}]$$

In Equation 6, B is determined as in Equation 3, and t represents the system time according to the P-BCCH frame. If the first slot of the BSPM transmission slot cycle is determined using Equation 6, the BSPM slot cycle can be synced with the P-BCCH frames as illustrated in FIG. 4.

More specifically, for example, since the duration of the P-BCCH slot is 80 ms and the duration of the P-BCCH frame is 40 ms, two P-BCCH frames of the system time, each frame having duration of 40 ms, can be combined to correspond with the duration of the P-BCCH slot.

Figure 5:
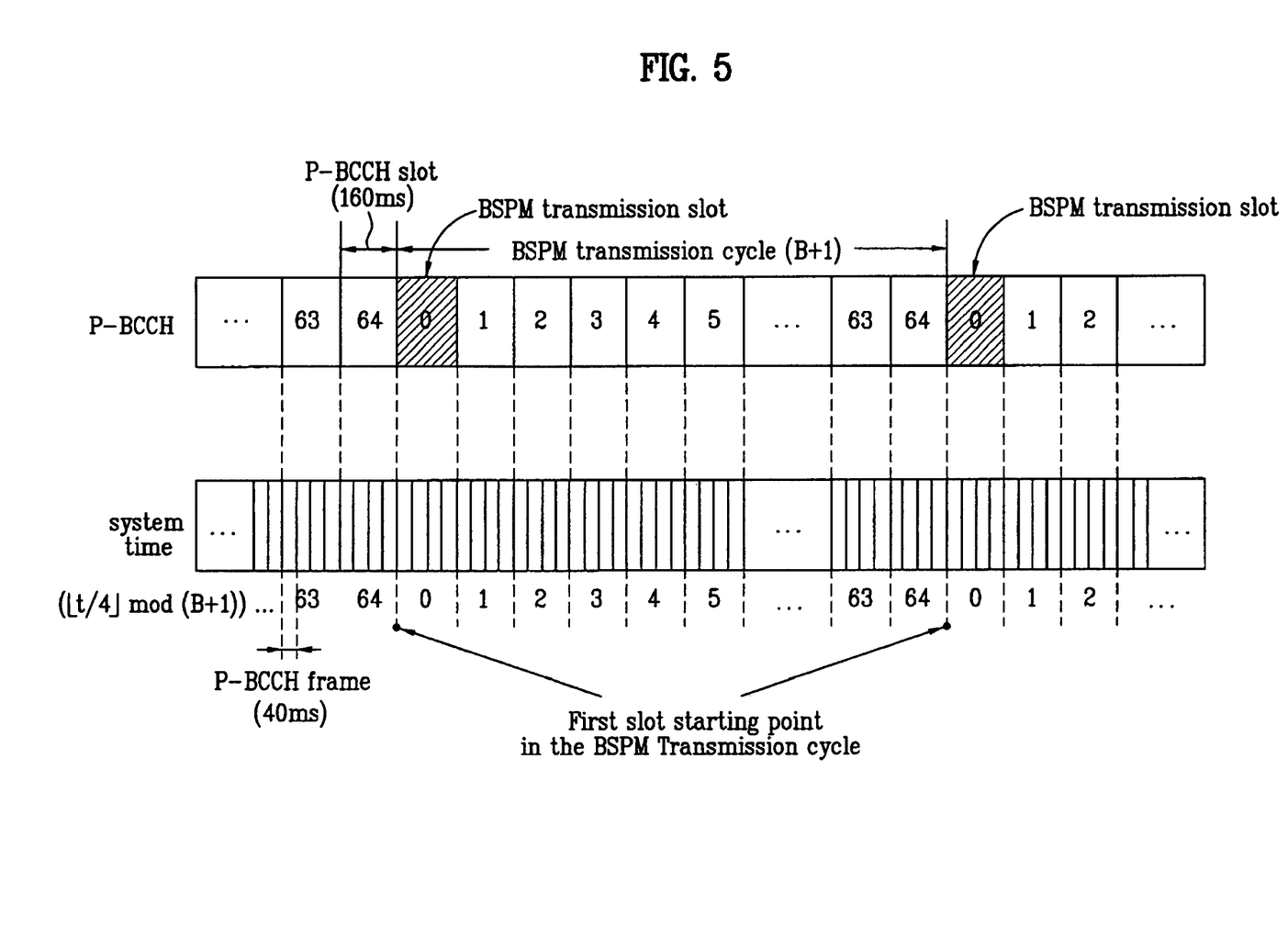
FIG. 5 illustrates an example of transmitting the BSPM via the P-BCCH where BSPM_PERIOD_INDEX is 2 and the duration of the P-BCCH is slot 160 ms.

FIG. 5 illustrates an example of transmitting the BSPM via the P-BCCH according to a third embodiment of the present invention. In FIG. 5, BSPM_PERIOD_INDEX is 2, and the duration of the P-BCCH slot is 160 ms.

In the present embodiment, since the duration of the P-BCCH frame corresponding to the system time is 40 ms and the duration of the P-BCCH slot is 160 ms, there is no one-to-one correspondence as found in FIG. 3. As such, the first slot of the BSPM transmission slot cycle with respect to the system time can be determined by satisfying Equation 7.

$$\left[\frac{t}{4}\right] \bmod (B+1) = 0 \qquad [\text{Equation 7}]$$

In Equation 7, B is determined as in Equation 3, and t represents the system time according to the P-BCCH frame. If the first slot of the BSPM transmission slot cycle is determined by using Equation 7, the BSPM slot cycle can be synced with the P-BCCH frames as depicted in FIG. 5.

For example, since the duration of the P-BCCH slot is 160 ms, four P-BCCH frames of the system time, each frame having duration of 40 ms, can be combined to correspond with the duration of the P-BCCH slot.

Figure 6:
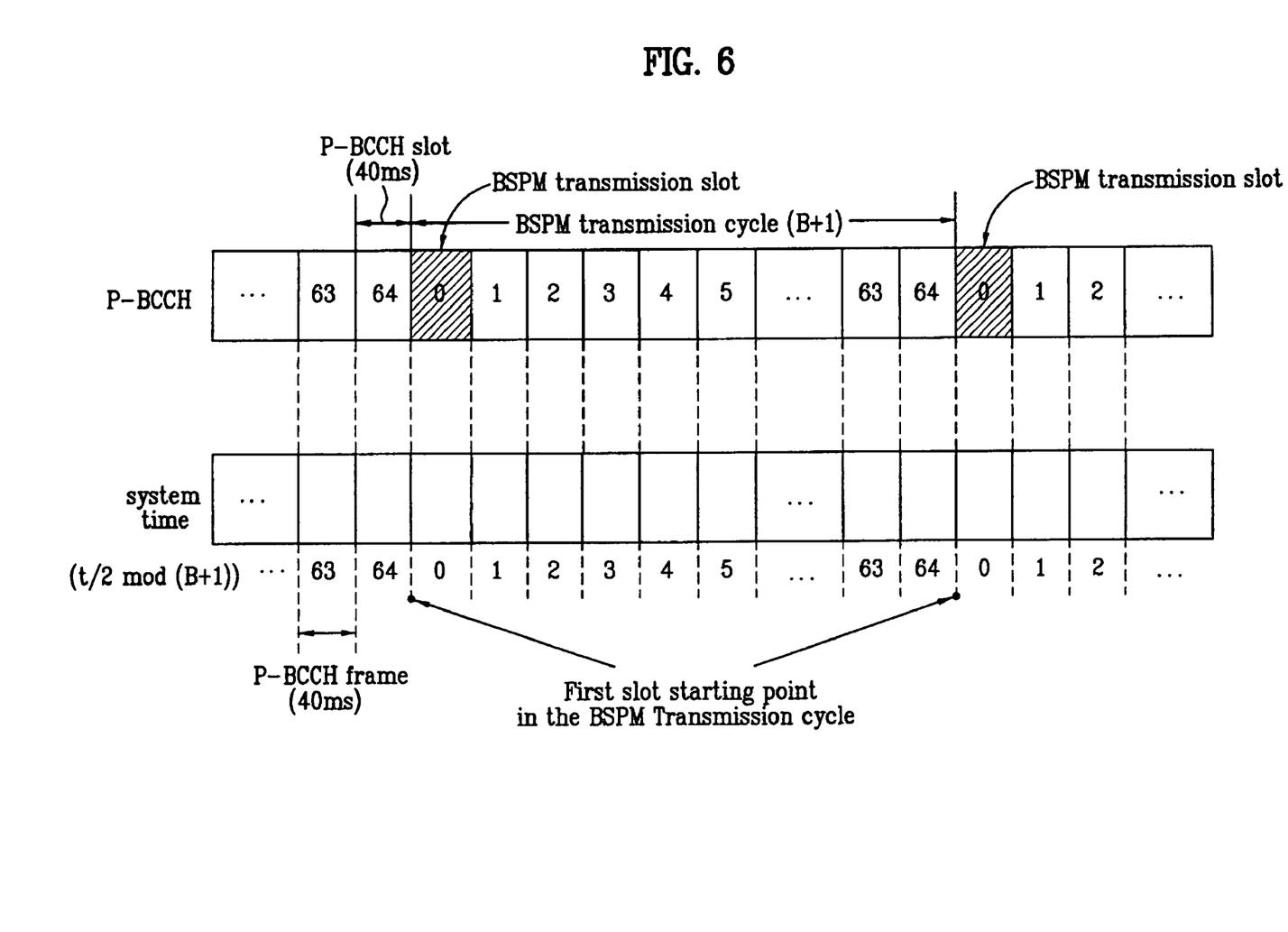
FIG. 6 illustrates an example of transmitting the BSPM via the P-BCCH according to a fourth embodiment of the present invention where the duration of the P-BCCH frame of the system time is 20 ms.

FIG. 6 illustrates an example of transmitting the BSPM via the P-BCCH according to a fourth embodiment of the present invention where the duration of the P-BCCH frame corresponding to the system time is 20 ms. Again, as in FIG. 3, in FIG. 6, BSPM_PERIOD_INDEX is 2 and the duration of the P-BCCH slot is 40 ms.

In the present embodiment, the duration of the P-BCCH frame corresponding to the system time is 20 ms and the duration of the P-BCCH slot is 40 ms, the first slot of the BSPM transmission slot cycle with respect to the system time can be determined by satisfying Equation 8.

$$\left[\frac{t}{2}\right] \bmod (B+1) = 0 \qquad [\text{Equation 8}]$$

In Equation 8, B is determined as in Equation 3, and t represents the system time in 20 frames. If the first slot of the BSPM transmission slot cycle is determined using Equation 8, the BSPM slot cycle can be synced with the P-BCCH frames as depicted in FIG. 6.

More specifically, for example, since the duration of the P-BCCH slot is 40 ms and the duration of the P-BCCH frame corresponding to the system time is 40 ms, one P-BCCH frame can be used to correspond with the duration of the P-BCCH slot of 40 ms.

Figure 7:
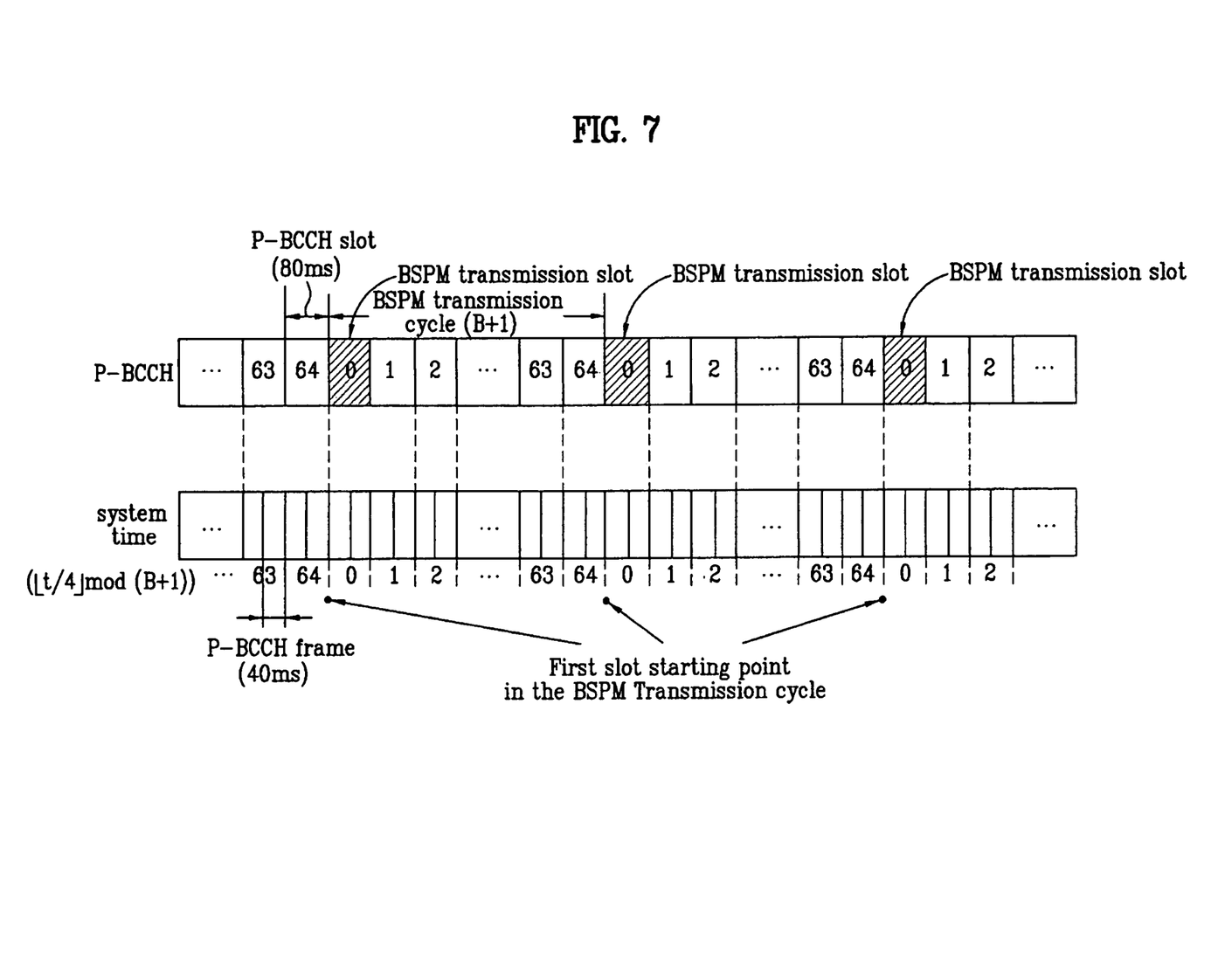
FIG. 7 illustrates an example of transmitting the BSPM via the P-BCCH according to a fifth embodiment of the present invention where the duration of the P-BCCH frame of the system time is 20 ms.

FIG. 7 illustrates an example of transmitting the BSPM via the P-BCCH according to a fifth embodiment of the present invention where the duration of the P-BCCH frame corresponding to the system time is 20 ms. Again, as in FIG. 4, in FIG. 7, BSPM_PERIOD_INDEX is 2, and the duration of the P-BCCH slot is 80 ms.

In the present embodiment, since the duration of the P-BCCH frame corresponding to the system time is 40 ms and the duration of the P-BCCH slot is 80 ms, the first slot of the BSPM transmission slot cycle with respect to the system time can be determined by satisfying Equation 9.

$$\left[\frac{t}{4}\right] \bmod (B+1) = 0 \qquad [\text{Equation 9}]$$

In Equation 9, B is determined as in Equation 3, and t represents the system time in 20 frames. If the first slot of the BSPM transmission slot cycle is determined using Equation 9, the BSPM slot cycle can be synced with the P-BCCH frames as illustrated in FIG. 7.

More specifically, for example, since the duration of the P-BCCH slot is 80 ms and the duration of the P-BCCH frame corresponding to the system time is 40 ms, two P-BCCH frames, each frame having duration of 40 ms, can be grouped to correspond with the duration of the P-BCCH slot of 80 ms.

Figure 8:
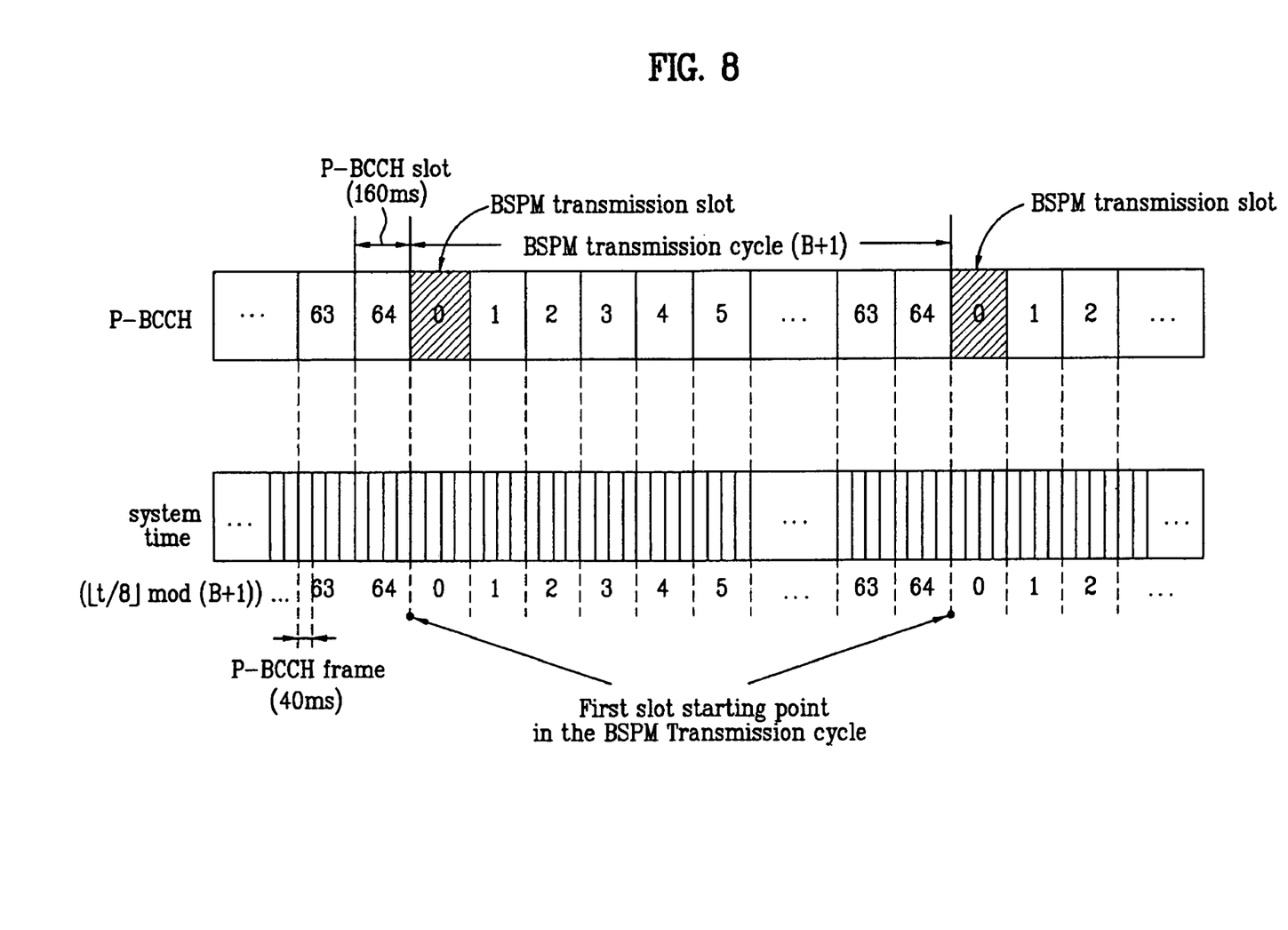
FIG. 8 illustrates an example of transmitting the BSPM via the P-BCCH according to a sixth embodiment of the present invention where the duration of the P-BCCH frame of the system time is 20 ms.

FIG. 8 illustrates an example of transmitting the BSPM via the P-BCCH according to a sixth embodiment of the present invention where the duration of the P-BCCH frame corresponding to the system time is 20 ms. Again, as in FIG. 5, in FIG. 8, BSPM_PERIOD_INDEX is 2, and the duration of the P-BCCH slot is 160 ms.

In the present embodiment, since the duration of the P-BCCH frame corresponding to the system time is 40 ms and the duration of the P-BCCH slot is 160 ms, the first slot of the BSPM transmission slot cycle with respect to the system time can be determined by satisfying Equation 10.

$$\left[\frac{t}{8}\right] \bmod (B+1) = 0 \qquad [\text{Equation 10}]$$

In Equation 10, B is determined as in Equation 3, and t represents the system time in 20 frames. If the first slot of the BSPM transmission slot cycle is determined by using Equation 10, the BSPM slot cycle can be synced with the P-BCCH frames as depicted in FIG. 8.

For example, since the duration of the P-BCCH slot is 160 ms, four P-BCCH frames corresponding to the system time, each frame having duration of 40 ms, can be combined to correspond with the duration of the P-BCCH slot of 160 ms.

In the descriptions of above, the BSPM is transmitted through the BCCH. However, the application of the present invention is not limited to BCCH or BSPM. The present invention can be further applied to transmission of overhead messages, which is transmitted based on a specified slot cycle, via a control channel. Here, the control channel represents the durations of the slots which change correspondingly to the data rates.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting an overhead message via a control channel having at least one slot, the method comprising:

transmitting an overhead slot cycle index to allow a mobile station (MS) to determine an overhead slot cycle;

receiving information of the overhead slot cycle determined by the MS based on a variable duration of the slot and the overhead slot cycle index, wherein the overhead slot cycle is repeatedly used;

transmitting the overhead message on the first slot of each overhead slot cycle provided from the received information, wherein the first slot of each overhead slot cycle is determined by any of a first equation of $$\left\lfloor \frac{t}{2} \right\rfloor \mathrm{mod}(B+1) = 0$$

wherein the variable duration of the slot is 40 ms, a second equation of $$\left\lfloor \frac{t}{4} \right\rfloor \mathrm{mod}(B+1) = 0$$

wherein the variable duration of the slot is 80 ms, or a third equation of $$\left\lfloor \frac{t}{8} \right\rfloor \mathrm{mod}(B+1) = 0$$

wherein the variable duration of the slot is 160 ms.

2. The method of claim 1, wherein the slot is any Primary Broadcast Control Channel (P-BCCH) slot.

3. The method of claim 1, wherein the first slot of each overhead slot cycle is determined by the first equation of $$\left\lfloor \frac{t}{2} \right\rfloor \mathrm{mod}(B+1) = 0,$$

to synchronize Primary Broadcast Control Channel (P-BCCH) frames with the overhead slot cycle, wherein a duration of a Primary Broadcast Control Channel (P-BCCH) frame is 40 ms.

4. The method of claim 3, wherein t represents system time in 20 ms frames, and B+1 represents the duration of the overhead slot cycle.

5. The method of claim 3, wherein B is determined by a parameter in a Multi-Carrier Radio Resource (MC-RR) Parameters Message.

6. The method of claim 1, wherein the first slot of each overhead slot is determined by the second equation of $$\left\lfloor \frac{t}{4} \right\rfloor \mathrm{mod}(B+1) = 0,$$

to synchronize Primary Broadcast Control Channel (P-BCCH) frames with the overhead slot cycle, wherein a duration of a Primary Broadcast Control Channel (P-BCCH) frame is 40 ms.

7. The method of claim 6, wherein t represents system time in 20 ms frames, and B+1 represents the duration of the overhead slot cycle.

8. The method of claim 6, wherein B is determined by a parameter in a Multi-Carrier Radio Resource (MC-RR) Parameters Message.

9. The method of claim 1, wherein the first slot of each overhead slot is determined by the third equation of $$\left\lfloor \frac{t}{8} \right\rfloor \mathrm{mod}(B+1) = 0,$$

to synchronize Primary Broadcast Control Channel (P-BCCH) frames with the overhead slot cycle, wherein a duration of a Primary Broadcast Control Channel (P-BCCH) frame is 40 ms.

10. The method of claim 9, wherein t represents system time in 20 ms frames, and B+1 represents the duration of the overhead slot cycle.

11. The method of claim 9, wherein B is determined by a parameter in a Multi-Carrier Radio Resource (MC-RR) Parameters Message.

12. The method of claim 1, wherein the overhead slot cycle is a Broadcast Multicast Service (BCMCS) System Parameters Message (BSPM) slot cycle.

13. A method of receiving an overhead message via a control channel having at least one slot, the method comprising:

receiving an overhead slot cycle index from a base station (BS) to determine an overhead slot cycle;

determining the overhead slot cycle based on a variable duration of the slot and the overhead slot cycle index received from the BS, wherein the first slot of each overhead slot cycle is determined by any of a first equation of $\lfloor t/2 \rfloor \mathrm{mod}\ (B+1)=0$ wherein the variable duration of the slot is 40 ms, a second equation of $\lfloor t/4 \rfloor \mathrm{mod}\ (B+1)=0$ wherein the variable duration of the slot is 80 ms, or a third equation of $\lfloor t/8 \rfloor \mathrm{mod}\ (B+1)=0$ wherein the variable duration of the slot is 160 ms;

transmitting to the BS information of the determined overhead slot cycle; and receiving the overhead message via a first slot of each overhead slot cycle.

* * * * *